Figure 1:
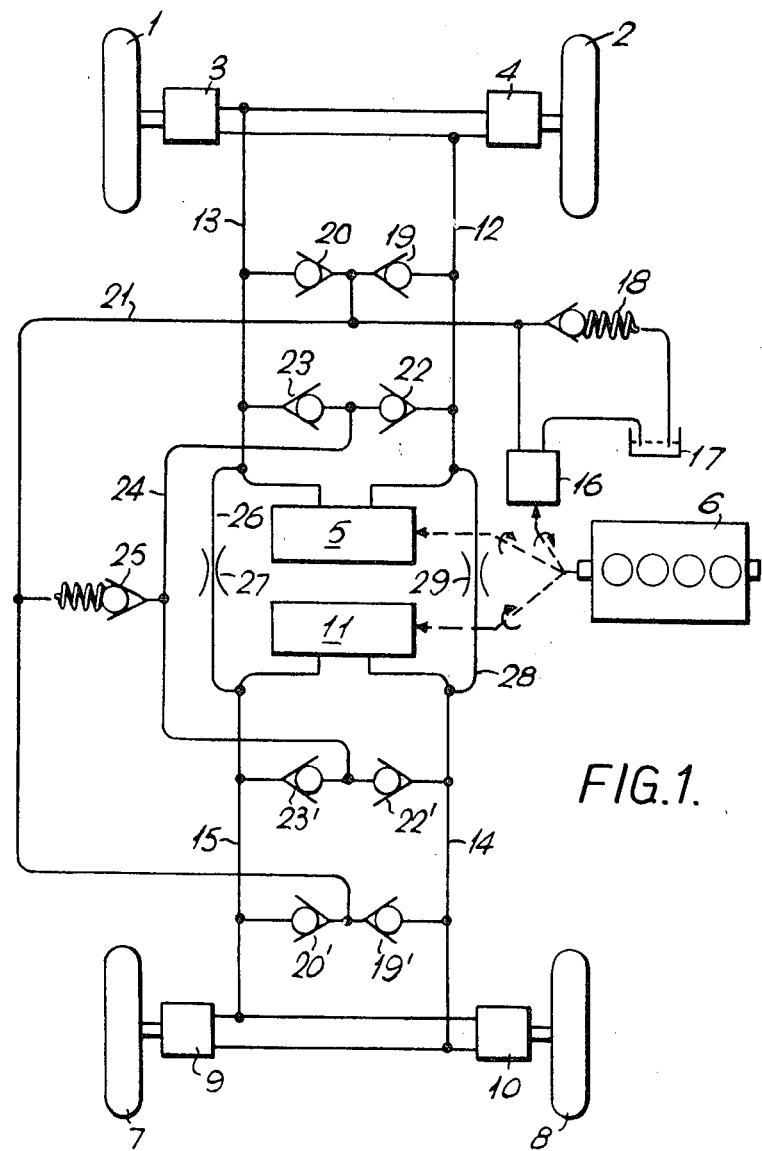

United States Patent

Hancock et al.

[15] 3,641,765
[45] Feb. 15, 1972

[54] HYDROSTATIC VEHICLE TRANSMISSION

[72] Inventors: Roger Harvey Yorke Hancock; James McCallum, both of East Kilbride, Scotland

[73] Assignee: National Research Development Corporation, London, England

[22] Filed: Mar. 3, 1970

[21] Appl. No.: 16,188

[30] Foreign Application Priority Data

Mar. 13, 1969  Great Britain.......................13,339/69

[52] U.S. Cl. ...............................60/53 A, 60/53 R, 180/44 F
[51] Int. Cl. .........................................................F15b 15/18
[58] Field of Search ............................60/53 A, 53; 180/44 F

[56] References Cited

UNITED STATES PATENTS

| | | | |
|---|---|---|---|
| 3,091,930 | 6/1963 | Thoma et al. | 60/53 R |
| 2,996,135 | 8/1961 | Grabow | 60/53 A |
| 2,804,016 | 8/1957 | Moore | 60/53 R |
| 3,065,700 | 11/1962 | Blenkle | 60/53 A |
| 2,941,609 | 6/1960 | Bowers et al. | 60/53 R |
| 3,170,297 | 2/1965 | Larson | 60/53 A |

*Primary Examiner*—Edgar W. Geoghegan
*Attorney*—Cushman, Darby & Cushman

[57] ABSTRACT

A hydrostatic transmission system for a vehicle. Separate pumping sources each supply a wheel motor or group of wheel motors over respectively separate circuits each having a high-pressure and a low-pressure fluid line and conventional interconnecting valves, enabling the two fluid lines to exchange functions on over-run or for reversing. To provide for limited differential action between the separate circuits their corresponding fluid lines are interconnected through a flow-restrictive passage.

The two pumping sources may be derived from a single pump by the cylinders during a pumping stroke delivering in succession into separate delivery ports which communicate with different circuits. The leakage across the land between adjacent delivery ports may be arranged to fulfill the function of the flow-restrictive passage. The access hole to a cylinder may be made bigger than the land between delivery ports to interconnect them and the cylinder momentarily to fulfill the functions of the flow-restrictive passage.

5 Claims, 5 Drawing Figures

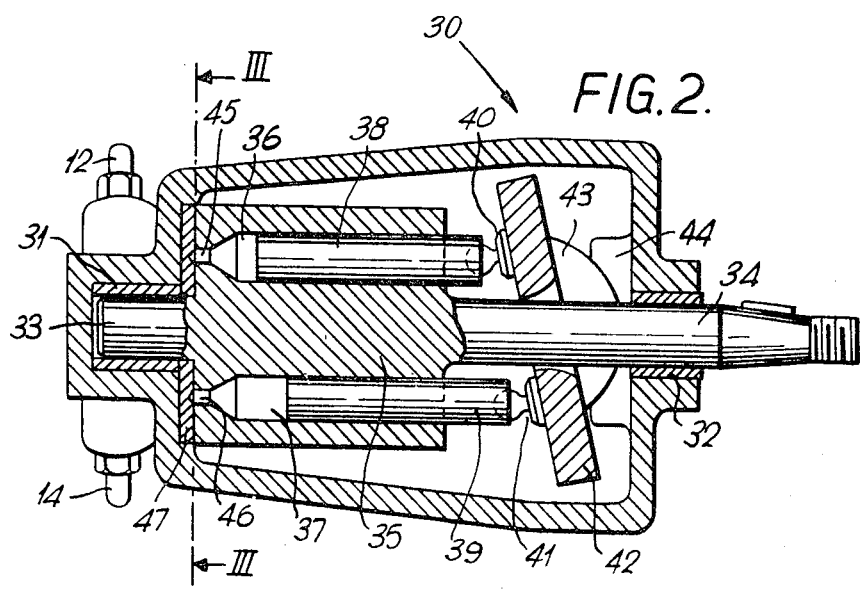
FIG. 2.
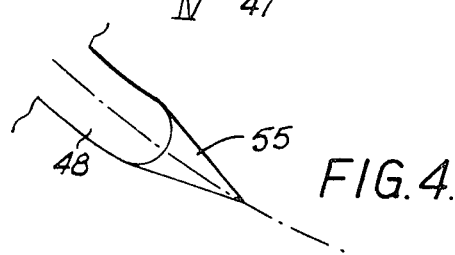
FIG. 3.
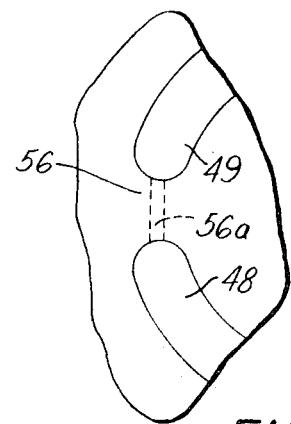
FIG. 4.
FIG. 5

HYDROSTATIC VEHICLE TRANSMISSION

This invention relates to a vehicle transmission system, in which variable delivery engine-driven pumping means drive individual motors each driving a separate wheel, track or the like.

The invention is concerned with the problem of providing limited slip differential drive between the individual motors or groups thereof.

Where a single pump delivers pressurized fluid to a number of wheel motors in parallel, a single slipping wheel causes the motor which drives it to usurp the whole of the fluid flow available from the pump so that the pressure in the system falls and all the wheel motors are disabled, in the same way as happens with conventional differential gearing in the drive path between the prime mover and the wheels of a vehicle.

It is known to provide separate pumps each delivering pressurized fluid into a separate circuit supplying a wheel motor or group of wheel motors. The pumps are driven in parallel from the same prime mover and their capacities can be varied in unison, or differentially for tracked vehicles steered by driving the track on one side faster than that on the other.

When all pumps are delivering substantially equal flow into their respective circuits the slipping of a wheel or wheels supplied over a circuit, disables that circuit only, leaving the other circuits unaffected. The drive is thus maintained by motors connected to a circuit having none of the wheels connected to it, slipping. Unfortunately, however, this produces the same effects ("windup" for instance) as occur when all wheels are directly coupled to a single drive path. There must be some means whereby a wheel with a different diameter, or following a different path from that of another wheel supplied over a different circuit, can revolve at a different speed without setting up cumulative mechanical stresses in the vehicle. Similar provision is necessary to accommodate differences in the displacement or leakage rates of pumps and/or motors coupled to one circuit as compared with those coupled to another circuit.

This problem is solved according to the present invention by providing restrictive interconnections between the fluid lines pertaining to different circuits to permit crossflow adequate to avoid the above described disadvantages of separate pumps supplying separate motors or groups of motors over separate circuits but not such as to permit crossflow between circuits to a degree which would enable a slipping wheel to disable the whole transmission system.

According to one of its features a hydrostatic transmission system for a vehicle comprises two or more fluid pressure pumping sources adapted to be driven by a prime mover, separate movers each adapted to drive a wheel of the vehicle not driven by another motor, separate hydraulic circuits coupling each of the said sources to a motor or group of motors not coupled to another of the said sources and a flow-restrictive connection at least between the high-pressure conduits of the two circuits.

Preferably, the pumping sources are of the variable displacement type, means being provided for varying the displacement of the said sources in unison.

Preferably, similar flow-restrictive interconnections are provided between both the high-pressure and the low-pressure conduits, of the two circuits.

The wheel of the vehicle which is driven by a motor may be a ground-contacting wheel or it may drive the vehicle through the agency of a track of the like.

Each pumping source may be connected, via a separate hydraulic circuit, to a group of motors each driving a wheel of the vehicle, e.g., one group for the front wheels and another group for the rear wheels of the vehicle.

The invention will be more readily understood from the following description of certain embodiments thereof illustrated in the accompanying drawings in which:

FIG. 1 is a schematic diagram of a transmission system according to the invention, FIGS. 2 and 3 are respectively a section along the axis and a section normal to the axis, of an embodiment of pumping means according to the invention, FIG. 4 is an enlarged representation of a part of FIG. 3, and FIG. 5 shows a part of FIG. 2 in modified form and to a larger scale.

FIG. 1 shows a general arrangement according to the invention in which front wheels 1 and 2 of a vehicle are driven by hydrostatic motors 3 and 4 supplied from one pumping source 5 driven by a prime mover 6, and rear wheels 7 and 8 are driven by hydrostatic motors 9 and 10 supplied from a second pumping source 11 also driven by prime mover 6.

The pumping sources 5 and 11 may be of the fixed displacement type but are preferably of the variable displacement type, for instance the well-known axial piston swash plate type whereof the displacement is variable by varying the angle of the swash plate, and the subsequent description relates to the latter type of pump.

The two pumping sources 5 and 11 are driven directly in unison by prime mover 6 and their displacements are also variable in unison by control means which may be conventional. The hydraulic deliveries of the two pumping sources 5 and 11 are kept separate however, one driving motors 3 and 4 in parallel, over fluid lines 12 and 13 and the other driving motors 9 and 10 in parallel over fluid lines 14 and 15.

A separate precharge pump 16 draws hydraulic fluid from a sump 17 and delivers it at a pressure above atmospheric pressure to the low-pressure sides of the two pumping circuits, this pressure being regulated by a relief valve 18 which returns any excess to the sump 17.

A conventional system of nonreturn valves as commonly employed in closed-circuit hydraulic systems, is provided for each of the separate circuits supplied respectively by pumping sources 5 and 11, and as these nonreturn valve systems are the same for both circuits, only those for the circuit supplied by pumping source 5 will be described though those for the other circuit are denoted by the same reference numerals for corresponding items, the reference numerals for the said other circuit being primed.

Outwardly conducting nonreturn valves 19 and 20 connect fluid lines 12 and 13, respectively, to the precharge pressure line 21 into which precharge pump 16 delivers.

Inwardly conducting nonreturn valves 22 and 23 connect fluid lines 12 and 13 respectively to a high-pressure relief line 24 leading to a main pressure relief valve 25 which is common to the two circuits and which discharges excess pressure into precharge pressure line 21 over which it ultimately discharges to sump 17 via valve 18 should the pressure in line 21 rise above a predetermined precharge level.

As so far described, if one of the front wheels 1 or 2 loses adhesion the motor driving it will absorb the full output of pumping source 5 and correspondingly for the rear wheels 7 and 8. Should both front wheels lose adhesion, however, the rear wheels are not affected and will continue to propel the vehicle. This is, in itself desirable, but when all four wheels have normal road adhesion a number of factors may render it necessary to have some differential action as between the front wheels and the rear wheels, for instance the speeds of the wheels change relatively on turning a corner, the wheels of the two sets may not always be of the same diameter, the displacement of motors 3 and 4 may differ from that of motors 9 and 10, the leakage may be different as between the two circuits, the delivery of the two pumping sources 5 and 11 may not be identical in all settings of the swash plate control (or like displacement-adjusting means).

This problem is solved according to the invention by providing a leak path between the high-pressure lines of the two circuits.

Let it be supposed that in normal forward running lines 13 and 15 are the high-pressure lines from the pumping sources 5 and 11.

A line 26 interconnects lines 13 and 15 via a restrictor 27.

When the motors overrun the pumping sources, due for instance to throttling back the prime mover 6, the high-pressure lines 13 and 15 and the low-pressure lines 12 and 14 interchange their roles. Valve 19, previously interconnecting the precharge line 21 to line 12, now closes and valve 20 opens connecting the precharge line 21 to line 13. Valve 23, previously connecting line 13 to main relief valve line 24 now closes and valve 22, previously closed, opens to interconnect line 12 to line 24. Valves 19–, 20′, 22′ and 23′ operate similarly in respect of lines 14 and 15. The same operations take place when the pumping sources change over their delivery directions to drive the vehicle in reverse. A further interconnection 28 connects lines 12 and 14 via a restrictor 29.

The restrictors 27 and 29 provide small interconnection paths between the two circuits sufficient to enable, for instance, pumping source 11 to supply a certain amount of fluid to motors 3 and 4 if flow output of one pump is slightly greater than that of the other, or if wheels 1 and 7 require to rotate at a slightly different speed from that of wheels 2 and 8 e.g., when turning, but should wheels 1 and 2 both lose adhesion the flow through motors 3 and 4 from pumping source 11 would not be sufficient to do more than marginally reduce the flow to motors 9 and 10 so that the drive to wheels 7 and 8 would be maintained.

Various alternatives present themselves for the roles of pumping sources 5 and 11, amongst which are the following:

a. Two separate pumps driven by gearing from the prime mover 6 and with their displacement adjustment members ganged together.

b. A single multicylinder axial piston swash plate pump with alternate cylinders communicating with two separate porting systems.

c. A single multicylinder axial piston swash plate pump with the delivery and suction ports each divided into two sections each port section leading to a separate delivery or intake pipe (as the case may be). There will normally be sufficient leakage across the land separating the two sections of a port to enable the connections 26 an 28 and restrictors 27 and 29 to be dispensed with.

A pump according to "(c)" above is another feature of the invention and an embodiment thereof is illustrated in FIGS. 2, 3 and 4 which provide a somewhat simplified representation of a pump of a standard design except in respect of the porting arrangements.

A casing 30 provides bearings 31 and 32 for a spigot 33 at one end and a drive shaft 34 at the other end of a revolving cylinder block 35 which has cylinders such as 36 and 37 arranged around the axis of rotation in the manner of the chambers of a revolver.

Slidable in these cylinders are pistons such as 38 and 39 which have, coupled to their outer ends by ball and socket joints, pressure pads such as 40 and 41 which bear upon the surface of a swash plate 42, which can be swiveled about an axis in the plane of the said surface and normal to the plane of the paper, in FIG. 2.

This swiveling enables the effective strokes of the pistons in their cylinders to be varied to vary the displacement of the pump. Part-cylindrical bosses, one of which, 43, can be seen in FIG. 2, extend from the rear face of swash plate 42 and nest in part cylindrical beds, one of which, 44, can be seen in FIG. 2, provided in casing 30. This defines the swivel axis of swash plate 42. The means for varying the swivel angle of swash plate 42, which may take any one of a number of conventional forms, are not shown in FIG. 2.

The cylinders, such as 36 and 37 all have ports such as 45 and 46 opening into an end face of cylinder block 35 which bears against an end face of an insert port plate 47, containing ports 48, 49, 50 and 51, shown in FIG. 3, which communicate with delivery and intake ducts terminating in corresponding pipes which have been given the reference numerals of the corresponding fluid lines of FIG. 1.

Each cylinder changes over from pumping to intake as it passes through the position of cylinder 36 of FIG. 2 and from intake to pumping as it passes through the position of cylinder 37. In FIG. 3 therefore the land 52 separating ports 49 and 50 and the land 53 separating ports 51 and 48 define respectively the change over points from delivery to intake and from intake to delivery for each cylinder port (such as 45, 46) as it passes over them.

For the direction of rotation indicated by arrow 54 in FIG. 3, ports 48 and 49 are delivery ports and ports 50 and 51 are intake ports.

The ends of ports 49 and 50 adjacent to land 52 are grooved to provide progressive cutoff and opening characteristics and ports 51 and 48, adjacent to land 53, are similarly treated. The grooved end of port 48 being shown to an enlarged scale in FIG. 4. At its deepest point the "V" groove 55 is of the order of one-seventh of the thickness of port plate 47 but this dimension can be varied between wide limits, since the purpose of these grooves is to smooth out the transition from high pressure to low pressure on the part of a cylinder and the optimum groove configuration can best be found by trial and error for any given design of pump, choice of working pressure etc.

The pair of ports 48, 49, are separated by a land 56 and certain choices are available as to the design of this land, for instance it can be grooved or otherwise pierced, for instance by a narrow bore 56a shown in FIG. 5 which is self-explanatory to provide a leak path corresponding to restrictor 27 of FIG. 1 or reliance can be placed upon normal leakage.

Alternatively land 56 can be made circumferentially narrower than the cylinder ports such as 45, 46 so that for a brief interval both ports are simultaneously in communication with a cylinder and with one another permitting a momentary pressure equalization flow to take place between the two circuits of FIG. 1. The same applies to the land 57 separating ports 50 and 51 and it must be remembered that these ports become the high-pressure ports if swash plate 42 is swiveled clockwise past the vertical, to drive the vehicle in reverse.

At any instant, some of the total number of pistons are advancing into their cylinders and others are receding from their cylinders. At any instant, half of the number of pistons advancing into their cylinders are forcing fluid, through port 48, into fluid line 13 and the other half are forcing fluid through port 49 into fluid line 15. Each piston, for half of its inward stroke, communicates with port 48 and for the other half of its inward stroke it communicates with port 49. Thus fluid lines 13 and 15 each receive at all times one-half of the total delivery of the pump.

Should wheels 7 and 8 (for example) lose adhesion they and their motors 9 and 10 would be free to rotate and the pressure in line 15 and at port 49 would fall.

The pressure at port 48 and in line 13 would be substantially maintained, however, because it could only bleed away to a limited extent across land 56 into port 49 and fluid line 15.

The bleed path via land 56 will however permit interchange between fluid lines 13 and 15 to an extent sufficient to compensate for differences between the characteristics of the two circuits, e.g., different motor displacements, different leakages, different effective deliveries by the pump into the two fluid lines 13 and 15, differences between the diameters or the paths followed by wheels 1 and 2 as compared with wheels 7 and 8, etc.

We claim:

1. A hydrostatic transmission system for a vehicle comprising:

A plurality of fluid pressure pumping sources adapted to be driven by a prime mover Separate motors each adapted to drive a wheel of the vehicle not driven by another motor Separate hydraulic circuits coupling each of the said pumping sources to a motor or group of motors not substantially coupled to another of the said pumping sources A flow-restrictive connection at least between the high-pressure conduits of the said two circuits The fluid pressure pumping sources being derived, at any instant, from different cylinders of a single cylinder block having pistons and means for reciprocating the pistons sequentially in their respective cylinders Such different pistons at the said instant communicating with separate ports one of which communicates with each of the said separate hydraulic circuits.

2. A system according to claim 1 in which each cylinder of the said cylinder block, during a half-cycle of reciprocation of its piston during which the volume of the cylinder is diminishing communicates in succession with different delivery ports each in communication with a separate circuit supplying a motor or a group of motors.

3. A system according to claim 2 in which the said flow-restrictive passage takes the form of a leakage path across a land separating two of the said different delivery ports.

4. A system according to claim 3 in which each cylinder is equipped with an aperture traversing the said delivery ports adjacent ends of which are separated by the said land, the size of the said land being insufficient to block the said aperture, whereby, on traversing the said land the said aperture momentarily puts its cylinder into communication with both of the said delivery ports at the same time.

5. A system according to claim 3 in which adjacent delivery ports are interconnected by a flow-restrictive orifice drilled through the said land separating the said two delivery ports.

* * * * *